(12) United States Patent
Jang et al.

(10) Patent No.: US 8,352,243 B2
(45) Date of Patent: Jan. 8, 2013

(54) MULTI-LANGUAGE TRANSLATOR FOR SPECIFIC FIELDS OF KNOWLEDGE

(76) Inventors: Hai-Shan Jang, Exton, PA (US); Jian Zhang, Piscataway, NJ (US); Esther Y Yu, Holmdel, NJ (US)

( * ) Notice: Subject to any disclaimer, the term of this patent is extended or adjusted under 35 U.S.C. 154(b) by 400 days.

(21) Appl. No.: 12/800,572

(22) Filed: May 18, 2010

(65) Prior Publication Data

US 2011/0288849 A1 Nov. 24, 2011

(51) Int. Cl.
*G06F 17/20* (2006.01)
(52) U.S. Cl. .................................. 704/5; 704/2; 704/7
(58) Field of Classification Search .................. 704/2, 5, 704/7
See application file for complete search history.

(56) References Cited

U.S. PATENT DOCUMENTS

| | | | | |
|---|---|---|---|---|
| 5,497,319 A | * | 3/1996 | Chong et al. | 704/2 |
| 5,535,119 A | * | 7/1996 | Ito et al. | 704/3 |
| 5,612,872 A | * | 3/1997 | Fujita | 704/2 |
| 5,826,220 A | | 10/1998 | Takeda et al. | |
| 6,782,356 B1 | * | 8/2004 | Lopke | 704/5 |
| 7,464,021 B1 | * | 12/2008 | Myers et al. | 704/7 |
| 7,526,423 B2 | | 4/2009 | Suzuki | |
| 7,987,087 B2 | * | 7/2011 | Rich | 704/2 |
| 2004/0260532 A1 | | 12/2004 | Richardson et al. | |
| 2009/0198487 A1 | * | 8/2009 | Wong et al. | 704/4 |
| 2009/0299732 A1 | | 12/2009 | Hao et al. | |
| 2010/0235162 A1 | * | 9/2010 | Faddoul et al. | 704/6 |

* cited by examiner

*Primary Examiner* — James Wozniak

(57) ABSTRACT

The present invention relates to techniques for translating documents characteristic for a specific field of knowledge from a source language in a target language. Elements causing translation errors in exemplary documents translated by a machine translator (e.g., Internet-based translator, etc.) are used to compile databases of such elements or untranslatable symbols thereof and their equivalent constructs in the source and target languages. Then, using the databases, the elements causing translation errors are substituted in the being translated documents with the corresponding equivalent constructs.

20 Claims, 4 Drawing Sheets

╭─ 302
│
│   Evaluations and procedures that will be <u>performed</u> during the
│ <u>study</u> are as follows: <u>on Day-1</u>, your <u>study doctor</u> will distribute a
│ "<u>Clinical Trial Participation Card</u>" to you.
│ There is important participation information in the card including
│ your <u>study doctor</u>'s name,   <u>study agent</u> name, urgent contact
│ information, <u>etc</u>. You should keep this card with you all the time. In
│ case of emergency, you or another person should contact your
│ <u>study doctor</u> using this card. An <u>ECG</u> will be <u>performed</u> <u>on Day-1</u>
│ and <u>on Day 85</u>; you <u>will be required to fast from</u> food and liquid
│ (except water) <u>for at least 8 hours</u> <u>prior to ECG</u>, and have had no
│ caffeine consumption <u>4 hours prior to the ECG</u>. A urine test <u>for</u>
│ <u>alcohol and drugs of abuse</u> will be <u>performed</u> <u>on Day-1</u>.

╭─ 304
│
│   Evaluations and procedures that will be <u>conducted</u> during the
│ <u>research period</u> are as follows: *ELM000631_001*, your <u>research</u>
│ <u>doctor</u> will distribute a "*ELM000592_001*" to you.
│ There is important participation information in the card, including
│ your <u>research doctor</u>'s name, *ELM000537_001* name, urgent
│ contact information, <u>and so on</u>. You should keep this card with you
│ all the time. In case of emergency, you or another person should
│ contact your <u>research doctor</u> using this card. An <u>ECG checkup</u> will
│ be conducted *ELM000631_002* and *ELM000631_003*; you should
│ <u>avoid</u> food and liquid (except water), *ECG checkup prior to, for at*
│ *least 8 hours*, and have had no caffeine consumption, *the ECG*
│ *checkup prior to, 4 hours*. A urine test for *ELM000572_001* will be
│ conducted *ELM000631_004*.

FIG. 3

MULTI-LANGUAGE TRANSLATOR FOR SPECIFIC FIELDS OF KNOWLEDGE

FIELD OF THE INVENTION

The present invention relates generally to machine translation of documents and, more specifically, to multi-language machine translation of documents characteristic for specific fields of knowledge.

BACKGROUND OF THE INVENTION

Globalization made multi-language machine translation a necessity of modern life. To improve accuracy of translation from a source language in a target language, machine translators use grammatical rules and sentence-structure conversion schemes. However, in documents characteristic for specific fields of knowledge (e.g., technology, medicine, finances, art, etc.) sentences are not necessarily generated on the basis of only grammatical rules, and translation of such documents represents a challenging task.

SUMMARY OF THE INVENTION

A computer program product, apparatus, and method for translating documents characteristic for a specific field of knowledge from a source language in a target language are disclosed.

In one embodiment, prior to translating such documents, an exemplary document (or documents) from this field of knowledge is translated from the source language in the target language using a remote machine translator (e.g., Internet-based translator, etc.). Elements causing translation errors in the exemplary document are determined and used to compile databases of such elements or symbols thereof and equivalent expressions in the source and/or target languages. Then, a modified exemplary document is produced, wherein these elements are substituted with the equivalent expressions and/or symbols, translated in the target language and, in the translated modified exemplary document, the symbols are substituted with their equivalent expressions in the target language. These steps are repeated until a number of translation errors in the translated exemplary document(s) does not exceed a preselected threshold.

Thereafter, using the compiled databases, the documents characteristic for the specific field of knowledge are modified by substituting the elements causing translation errors with their equivalent expressions or symbols, such modified documents are translated using the remote machine translator, and the symbols in the translated modified documents are substituted with their equivalent expressions in the target language.

Various other aspects and embodiments of the invention are described in further detail below.

All objects, features and advantages of the present invention will become apparent in the following detailed written description and appended drawings.

It has been contemplated that features or method steps of one embodiment of the invention may be incorporated in other embodiments thereof without further recitation.

The Summary is neither intended nor should it be construed as being representative of the full extent and scope of the present invention, which these and additional aspects will become more readily apparent from the detailed description, particularly when taken together with the appended drawings.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

FIG. 3 is an illustration of portions of the method of FIGS. 2A-2B.

Figure 1:
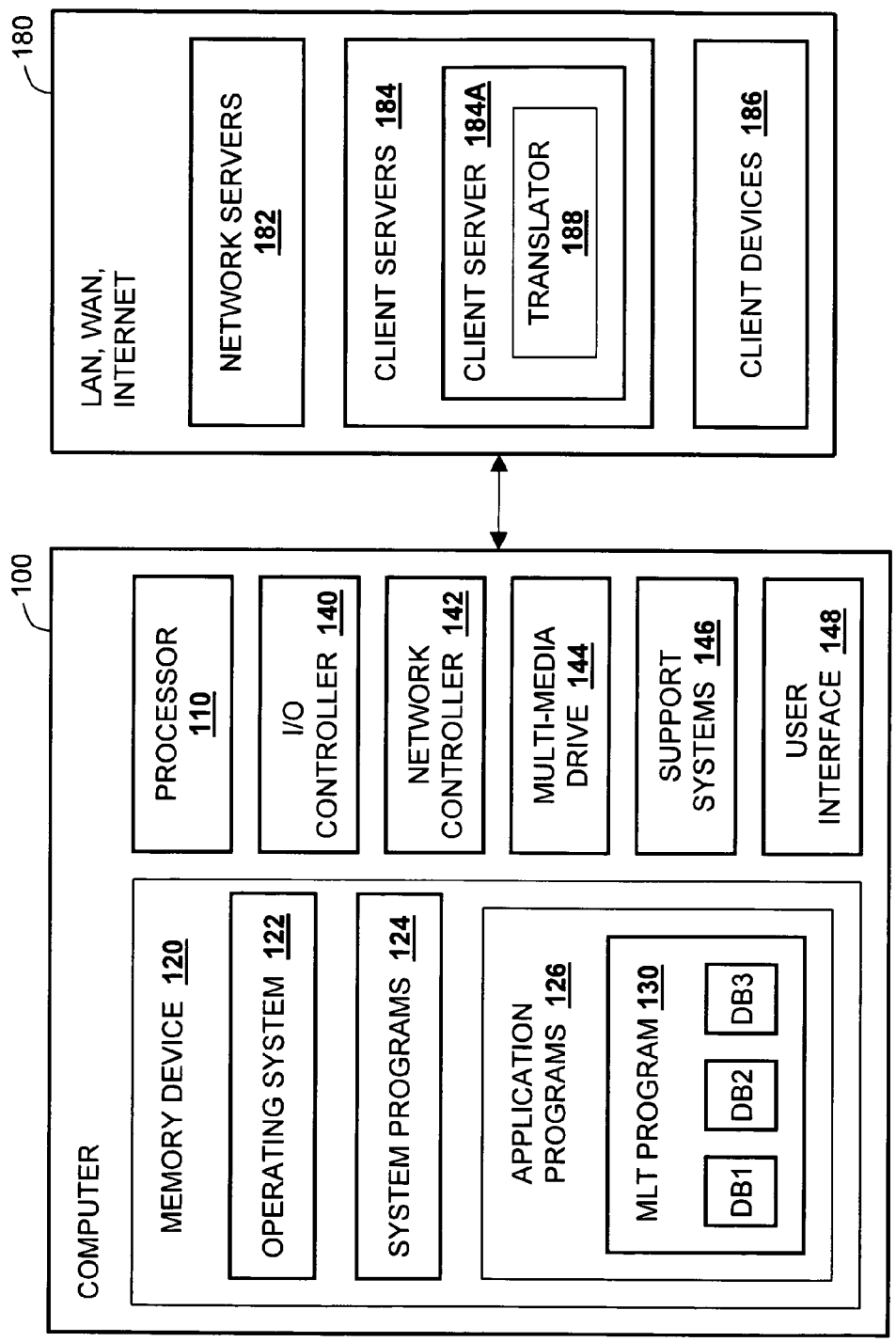
FIG. 1 is a high level block diagram of an exemplary computer configured for implementing one or more embodiments of the invention.

The images in the drawings are simplified for illustrative purposes and are not depicted to scale.

To facilitate understanding, identical reference numerals are used in the drawings to designate, where possible, substantially identical elements that are common to the figures, except that alphanumerical extensions and/or suffixes may be added, when appropriate, to differentiate such elements.

DETAILED DESCRIPTION

The present invention provides a computer program product, apparatus, and method for translating documents characteristic for a specific field of knowledge (i.e., specialty documents) from a source language in a target language. The invention may advantageously be utilized for machine translation of technical, scientific, medical, judicial, financial, and other documents containing field of knowledge specific content.

With reference now to the figures, and in particular with reference to FIG. 1, there is depicted a high level block diagram of an illustrative embodiment of an exemplary computer 100 in accordance with one or more embodiments the present invention. The term "computer" is broadly used herein in reference to a server, a general purpose or specialized computer, and other data processing apparatuses and/or portions or combination thereof. Alternatively, the computer 100 may be a portion of an integrated communication and data processing apparatus or system.

The computer 100 generally comprises a processor 110, a memory device 120, an input/output (I/O) controller 140 providing connectivity to peripheral devices, a network controller 142 providing connectivity to a network 180, a multimedia drive 144, support systems 146, and a user interface 148. Components of the computer 100 may be implemented as hardware devices, software modules, firmware, or any combination thereof. Specifically, the memory device 120 may include (not shown) cache memory, random access memory (RAM), read only memory (ROM), and/or firmware memory, as well as other storage elements.

Those of ordinary skills in the art will appreciate that hardware and software configurations depicted in FIG. 1 may vary. For example, in particular embodiments, other such components may be used in addition to or in place of the depicted components.

Generally, the memory device 120 contains code of an operating system (OS) 122 (e.g., Microsoft Windows®, GNU®/Linux®, Advanced Interactive eXecutive® (AIX) operating system, etc.), code of system programs 124, and code of application programs 126. In other embodiments, portions of the OS 120 or programs 124, 126 may reside in a remote memory device (not shown) communicatively coupled to the computer 100.

In the described embodiment, the computer 100 is connected to the network 180, such as the Internet, an Intranet, a local area network (LAN), a wide area network (WAN), or a combination thereof. The network 180 generally includes pluralities of network servers 182, client servers 184, and client computerized devices 186 (e.g., computers, integrated mobile or stationary communication and/or data processing devices, and the like).

One of the servers 182, 184 or devices 186 (as shown, server 184A) comprises a machine translator 188. The translator 188 is an executable application program, which is adapted for performing machine translation of documents from at least one source language in at least one target language. Examples of such machine translators include, but not limited to, Internet-based machine translators of Google Inc. of Mountain View, Calif. (http://translate.google.com/#), Yahoo! Inc. of Sunnyvale, Calif. (http://babelfish.yahoo.com/), and Microsoft Corporation of Redmond, Wash. (http://www.microsofttranslator.com/).

In an alternate embodiment, portions of the translator 188 may be distributed among several servers 184 or apparatuses 186. In yet another embodiments, the translator 188 may be an application program at least in part stored in or executed by the computer 100.

In the computer 100, the application programs 126 include, among other software and/or firmware components, a multi-language translating (MLT) program 130 comprising at least one database DB (databases DB1-DB3 are shown) of pre-selected constructs in the source and target languages. The MLT program 130 provides, together with the translator 188, machine translation of documents characteristic for a specific field of knowledge from a source language in a target language. In an alternate embodiment, at least portions of the MLT 130 or databases DB may be stored in or executed by one or several servers 182, 184 or apparatuses 186.

In one embodiment, after initiating the MLT program 130, using features of the user interface 148, a user of the computer 100 may enter the documents to be translated (or portions thereof) in the pre-designed fields defined on a display of the computer (e.g., by performing Copy & Paste operations). In an alternate embodiment, only links to such documents (i.e., network addresses thereof) may be provided to the MLT program 130.

In operation, using the databases DB, the MLT program 130 modifies the entered documents as discussed below in reference to FIGS. 2A-2B, forwards the modified documents to an apparatus executing the translator 188 (e.g., server 184A), retrieves the translated modified documents therefrom to the computer 100, completes translation of the documents (also discussed below in reference to FIGS. 2A-2B), and outputs the translated documents in a user-defined format.

Among the software instructions provided by the MLT program 130 and which are specific to the invention, are: (a) using a machine translator, translating from a source language in a target language an exemplary document characteristic for a specific field of knowledge; (b) determining in the exemplary document elements causing translation errors and compiling databases of such elements or symbols thereof and equivalent expressions in the source and target languages; (c) producing a modified exemplary document wherein the elements are substituted with the equivalent expressions or symbols, translating the modified exemplary document using the translator and substituting the symbols in the translated modified exemplary document with their equivalent expressions in the target language; (d) repeating at least portions of the steps (b) and (c) until a number of translation errors in the modified translated exemplary document does not exceed a pre-selected threshold; (e) replacing in the documents to be translated the elements with their equivalent expressions or symbols to produce modified versions of the documents; (f) translating the modified versions of the documents using the translator; and (g) substituting the symbols in the translated modified versions of the documents with their equivalent expressions in the target language.

Figure 2A:
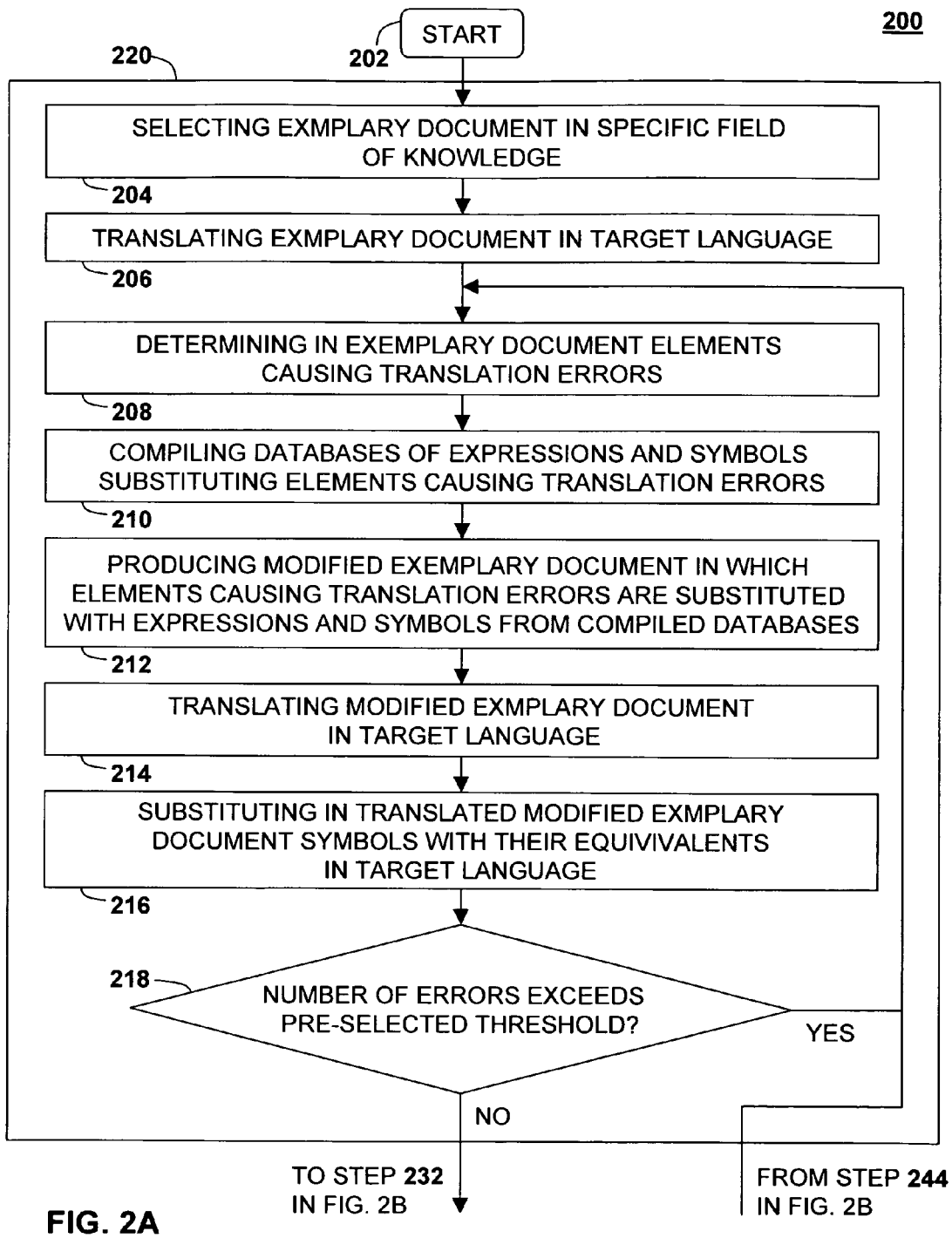
FIGS. 2A-2B are high level flowcharts of a method by which the features of the invention are implemented, according to one embodiment of the invention.
Figure 2B:
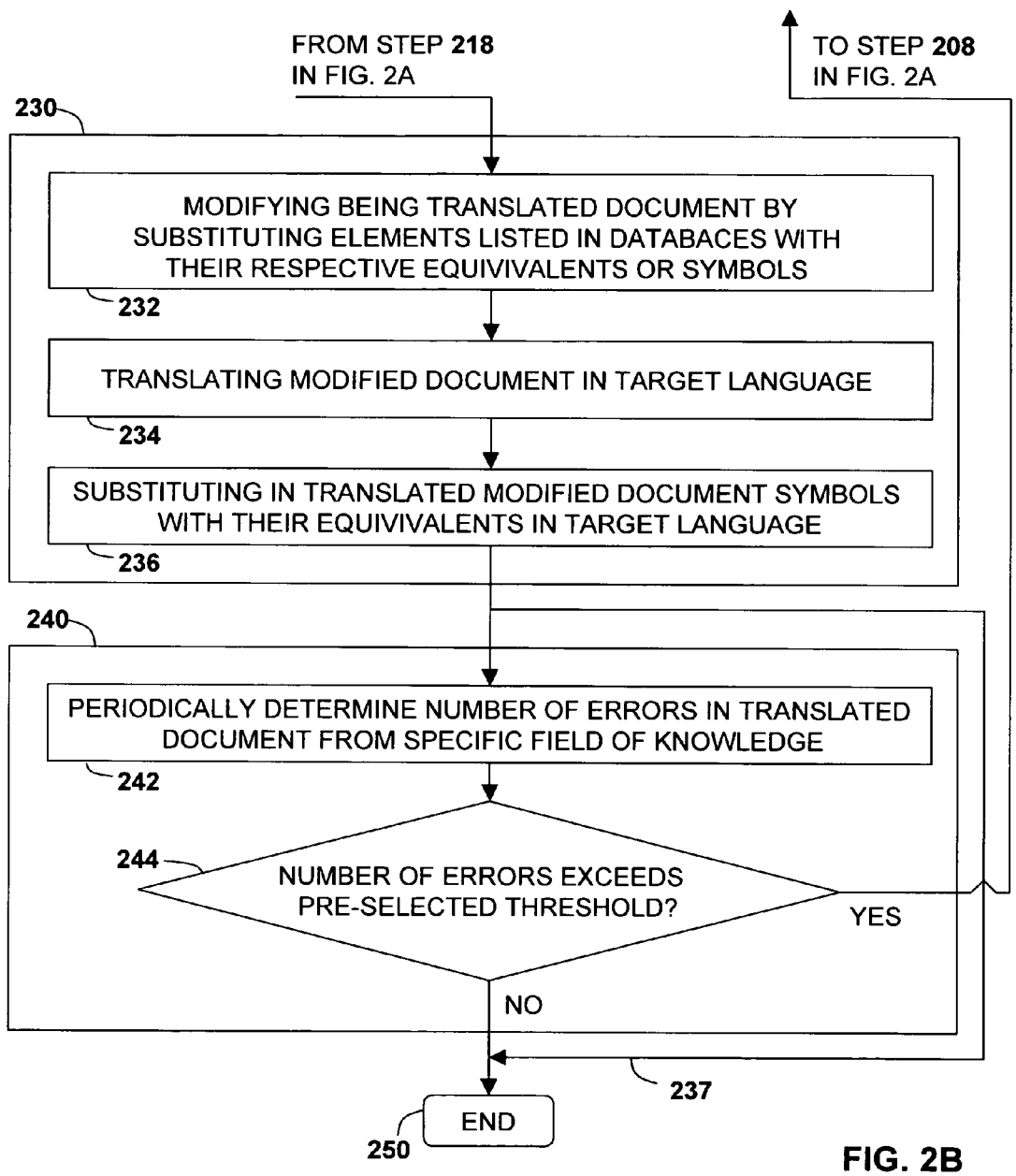

With reference now to FIGS. 2A-2B, there is illustrated a high level logical flowchart of a method 200 for translating documents characteristic for a specific field of knowledge from a source language in a target language in accordance with one embodiment of the present invention. To best understand the invention, the reader should refer to both FIGS. 1 and 2A-2B.

The method 200 starts at step 202 and includes a training sequence 220, a translating sequence 230, and an optional verification sequence 240.

Referring to the training sequence 220, at step 204, a document characteristic (i.e., representative) for a specific field of knowledge and available in a source language (or a plurality of such documents) is (are) selected by a person (or persons) proficient the field of knowledge and the respective source and target languages (e.g., English, Dutch, Chinese, Japanese, etc.). Herein, such representative documents are collectively referred to as an "exemplary document", the term "document" may refer to a single document or multiple documents, and the abovementioned persons are collectively referred to as an "expert".

The specific field of knowledge is broadly defined herein as any area of human activities (e.g., science, technology, industry, social affairs, finances, art, official regulations, etc.), in which relevant documents contain terms, idioms, non-grammatical forms or expressions, and other constructs that are difficult to translate in foreign (i.e., target) languages using conventional machine translators.

At step 206, the exemplary document is translated from the source language in the target language using a machine translator (e.g., Internet-based translator 188). Occasionally, the exemplary document is forwarded to the translator in portions having a pre-determined number of words or characters.

At step 208, the expert determines translation errors in the translated exemplary document and defines in the exemplary document elements (i.e., portions of text) that cause these errors.

At step 210, the expert classifies such elements of the exemplary document and compiles one or more databases of the elements or symbols thereof and their equivalent expressions in the source and target languages. In one embodiment, the expert compiles three databases of such elements.

A first database (e.g., database DB1) includes a table(s) of elements being misinterpreted by the translator and the corresponding equivalent substitutions for these elements in the source language (i.e., terms or expressions adapted for error-free interpretation by the translator). For example, an equivalent substitution for the element "take part in" may be the verb "participate" (e.g., in the sentence "We invite you to take part in an experiment."), or an equivalent substitution for the elements "serious" and "weight loss" in medical reports and the like documents may be the terms "severe" and "loss of weight", respectively.

A second database (e.g., database DB2) includes a table(s) of rules defining grammatical structures or patterns misinterpreted by translator due to, e.g., omission thereof in the target language or a difference in grammatical forms in the source and target language. The rules are typically presented in a form of Regular Expressions (REGEXs) and may also prescribe how portions of text preceding/following the defined structures are reconstructed in the source or/and target language(s). Illustrative examples of these elements include structures such as "for at least/within 8 minutes/hours/days prior to/before/after ECG", "affects 1 to 10 users in 10,000", and the like. Using the table(s) of rules, the elements are reconstructed in expressions that may be correctly machine-translated in the target language (in this particular example, a Chinese language): "ECG prior to/before/after for at least/within 8 minutes/hours/days" and "in 10,000 users, 1 to 10 users are affected" respectively.

A third database (e.g., database DB3) includes a table(s) of idiomatic expressions or non-grammatical expressions in the source language and/or untranslatable alphanumeric or schematic symbols replacing such elements and corresponding equivalent substitutions for such elements in the target language. For example, an equivalent substitution for the element "study doctor" (e.g., in the sentence "You should contact your study doctor using this card.") may be an equivalent expression in the target language or, alternatively, an alphanumeric symbol (e.g., XGH123456, and the like.) arbitrarily assigned to the corresponding equivalent expression in the target language.

In other embodiments, the expert may combine portions of these databases, additionally or alternatively compile databases of other elements causing translation errors in the translated exemplary document, or compile either more or less than three databases of elements causing particular translation errors.

At step 212, a modified exemplary document is produced in which, using the databases of step 210, the elements causing translation errors are substituted (i.e., replaced) with their respective equivalent expressions, REGEXs, and/or untranslatable symbols. Such a modified exemplary document may be produced by the expert or, alternatively, using the MLT program 130.

FIG. 3 is an illustration of portions of steps 208 and 212 the method 200. A paragraph 302 is a portion of an exemplary document, in which elements causing translation errors are underlined. Correspondingly, a paragraph 304 is a modified paragraph 302 wherein such elements are substituted with corresponding equivalent expressions or untranslatable symbols from the databases DB of the MLT program 130. In particular, in the paragraph 304, equivalent expressions for elements being misinterpreted by the translator and the symbols are shown as underlined and italic strings, respectively, and elements lacking grammatically similar structures in the target language are shown as underlined italic strings.

At step 214, the modified exemplary document is translated from the source language in the target language using the machine translator of step 206 (e.g., Internet-based translator 188). Similar to step 206, the modified exemplary document may be forwarded to the translator in portions having a pre-determined number of words or characters.

At step 216, the translated modified exemplary document is retrieved and, using at least some of the databases of step 210 (e.g., database DB3 discussed in reference to step 210), the untranslatable symbols are substituted therein with their respective equivalent terms or expressions in the target language. In one embodiment, at least portions of these procedures are performed by the MLT program 130.

At step 218, the training sequence 220 queries whether in the translated and post-processed (step 216) modified exemplary document of step 216 a number of translation errors exceeds a pre-selected threshold (e.g., total number of translation errors, weighted sum of particular types of translation errors having various degrees of severity, and the like).

If the query is answered positively, the sequence 220 proceeds back to step 208, and steps 208, 210, 212, 214, and 216 are repeated, in full or partially, until the number of such errors in the translated exemplary document does not exceed the pre-selected threshold. If the query is answered negatively, the training sequence 220 is completed, and the method 200 proceeds to the translating sequence 230.

Referring to the translating sequence 230, at step 232, a document characteristic for the specific field of knowledge and chosen for being translated from the source language in the target language is converted in a modified document (e.g., by using the MLT program 130). In the modified document, the elements thereof causing translation errors (i.e., elements defined at step 208) are substituted with their respective equivalent expressions, REGEXs, and/or untranslatable symbols from the databases compiled at 210.

At step 234, the modified document is translated from the source language in the target language using the machine translator of step 206 (e.g., Internet-based translator 188). Similar to steps 206 or 214, the modified document may be forwarded to the translator in portions having a pre-determined number of words or characters.

At step 236, the translated modified document is retrieved and, using the databases of step 210 (e.g., database DB3), the untranslatable symbols are substituted therein with their equivalent terms or expressions in the target language. At least portions of these procedures may be performed by the MLT program 130. Thereafter, the translating sequence 230 is completed, and the method 200 ends (shown with link 237) at step 250 or, alternatively, method 200 proceeds to the optional verification sequence 240.

Referring to the verification sequence 240, at step 242, an expert periodically determines a number of translation errors the translated and post-processed (step 236) modified document characteristic for the specific field of knowledge (e.g., after translating a pre-selected plurality of the documents or upon expiration of a pre-selected time interval).

At step 244, the verification sequence 240 queries whether a number of translation errors in the translated modified document exceeds the pre-selected threshold of step 218.

If the query is answered positively, the sequence 220 proceeds back to the training sequence 220 and steps 208, 210, 212, 214, 216, and 218 are repeated, in full or partially, until the number of the translation errors in the translated document does not exceed the pre-selected threshold. In one embodiment, the document of step 242 is used in the training sequence 220 as an additional or replacement exemplary document. If the query is answered negatively, the verification sequence 240 is completed, and the method 200 proceeds to step 250, where the method 200 ends.

In operation, the verification sequence 240 allows to perform real-time updating of the databases of the elements causing translation errors, increase accuracy of translation, and adjust the method 200 for new or modified translators.

Although the present invention herein has been described with reference to particular preferred embodiments thereof, it is to be understood that these embodiments are merely illustrative of the principles and applications of the invention. Therefore, modifications may be made to these embodiments and other arrangements may be devised without departing from the spirit and scope of the invention, which is defined by the appended claims.

What is claimed is:

1. A computer program product for translating documents characteristic for a specific field of knowledge from a source language in a target language, the product comprising:

a non-transitory computer-readable storage medium; and
computer program code within the storage medium, said code having instructions for providing:

(a) translating from the source language in the target language, using a machine translator, an exemplary document characteristic for the specific field of knowledge;
(b) determining in the translated exemplary document elements causing translation errors and compiling databases of the elements or symbols thereof and their equivalent expressions in the source and target languages;
(c) producing a modified exemplary document wherein the elements are substituted with the equivalent expressions or symbols thereof, translating the modified exemplary document using the translator, and substituting the symbols in the translated modified exemplary document with their equivalent expressions in the target language;
(d) repeating at least portions of the steps (b) and (c) until a number of translation errors in the translated modified exemplary document does not exceed a pre-selected threshold;
(e) replacing in the documents the elements with their equivalent expressions or symbols to produce modified versions of the documents using the compiled databases;
(f) translating the modified versions of the documents using the translator; and
(g) substituting the symbols in the translated modified versions for their equivalent expressions in the target language.

2. The computer program product of claim 1, wherein the elements comprise:
first elements corresponding to portions of text being misinterpreted by the translator;
second elements corresponding to portions of text lacking similar structures in the target language; and
third elements corresponding to idiomatic expressions used in the specific field of knowledge.

3. The computer program product of claim 2, wherein the databases include a database of the first elements and equivalent constructs thereof in the source language, said constructs adapted for error-free interpretation by the translator.

4. The computer program product of claim 2, wherein the databases include a database of the second elements and equivalent Regular Expressions (REGEXs) thereof formulated in the source and/or target language(s).

5. The computer program product of claim 2, wherein the databases include a database of the third elements and alphanumeric or schematic symbols replacing the third elements, and equivalent substitutions therefor in the target language.

6. The computer program product of claim 1, wherein the translator is an application program adapted for performing machine translation from at least one source language in at least one target language.

7. The computer program product of claim 1, wherein the translator is an Internet, Intranet, LAN (local area network) or WAN (wide area network) based application program.

8. The computer program product of claim 1, wherein a portion of a memory device of a computerized apparatus including a server, a computer, an integrated communication and/or data processing device, or a combination thereof.

9. The computer program product of claim 1, wherein instructions further comprise:
analyzing the documents translated in the target language and updating said databases until the number of translation errors does not exceed the pre-selected threshold.

10. A data processing apparatus, comprising:
a memory device containing a code of a program for translating documents characteristic for a specific field of knowledge from a source language in a target language; and
a processor executing the code to perform functions including:
(a) translating from the source language in the target language, using a machine translator, an exemplary document characteristic for the specific field of knowledge;
(b) determining in the translated exemplary document elements causing translation errors and compiling databases of the elements or symbols thereof and their equivalent expressions in the source and target languages;
(c) producing a modified exemplary document wherein the elements are substituted with the equivalent expressions or symbols thereof, translating the modified exemplary document using the translator, and substituting the symbols in the translated modified exemplary document with their equivalent expressions in the target language;
(d) repeating at least portions of the steps (b) and (c) until a number of translation errors in the translated modified exemplary document does not exceed a pre-selected threshold;
(e) replacing in the documents the elements with their equivalent expressions or symbols to produce modified versions of the documents using the compiled databases;
(f) translating the modified versions of the documents using the translator; and
(g) substituting the symbols in the translated modified versions for their equivalent expressions in the target language.

11. The data processing apparatus of claim 10, wherein the memory device is a resident memory device, a remote memory device, a transferable storage medium, or a combination thereof.

12. The data processing apparatus of claim 10, wherein the apparatus is a server, a computer, an integrated communication and/or data processing device, or a combination thereof.

13. The data processing apparatus of claim 10, wherein the translator is an Internet, Intranet, LAN (local area network) or WAN (wide area network) based application program.

14. The data processing apparatus of claim 10, wherein the translator is an application program at least in part executable using (i) said apparatus, (ii) a server, or (iii) a remote computer, or (iv) an integrated communication and/or data processing device.

15. The data processing apparatus of claim 10, wherein the elements comprise:
first elements corresponding to portions of text being misinterpreted by the translator;
second elements corresponding to portions of text lacking similar structures in the target language; and
third elements corresponding to idiomatic expressions used in the specific field of knowledge.

16. The data processing apparatus of claim 15, wherein the databases include a database of the first elements and equivalent constructs thereof in the source language, said constructs adapted for error-free interpretation by the translator.

17. The data processing apparatus of claim 15, wherein the databases include a database of the second elements and equivalent Regular Expressions (REGEXs) thereof formulated using segments in the source and/or target language(s).

18. The data processing apparatus of claim 15, wherein the databases include a database of the third elements and alphanumeric or schematic symbols replacing the third elements, and equivalent substitutions therefor in the target language.

19. A computer program product for translating documents characteristic for a specific field of knowledge from a source language in a target language, the product comprising:
a non-transitory computer-readable storage medium; and
computer program code within the storage medium, said code having instructions for providing:
(a) selecting an exemplary document in the source language from the specific field of knowledge;
(b) translating the exemplary document from the source language in the target language using a remote or resident machine translator;
(c) determining in the exemplary document first, second, and third elements causing translation errors, wherein the first elements are portions of text being misinterpreted by the translator, the second elements are portions of text lacking grammatically similar structures in the target language, and the third elements are idiomatic expressions used in the specific field of knowledge;
(d) compiling a database of the first elements and equivalent constructs in the source language, the constructs adapted for error-free interpretation by the translator;
(e) compiling a database of the second elements and equivalent Regular Expressions (REGEXs) formulated using segments in the source or/and target language(s);
(f) compiling a database of the third elements and alphanumeric or schematic symbols replacing the third elements, and equivalent structures in the target language;
(g) producing a modified exemplary document wherein the first, second, and third elements are replaced with their constructs, REGEXs, structures, or symbols;
(h) using the translator, translating the modified exemplary document;
(i) in the translated modified exemplary document, substituting the symbols with the equivalent structures in the target language;
(j) repeating at least portions of the steps (c) through (i) until a number of translation errors in the translated modified exemplary document does not exceed a pre-selected threshold; and
(k) performing the steps of:
defining in the documents the first, second, and third elements;
producing modified versions of the documents by replacing therein the first, second, and third elements with their constructs, REGEXs, structures, or symbols;
translating the modified documents using the translator; and
in the translated modified documents, substituting the symbols with the structures thereof in the target language.

20. The computer program product of claim 19, wherein the instructions further comprise:
analyzing the documents translated in the target language and updating said databases until the number of translation errors does not exceed the pre-selected threshold.

* * * * *